US010476429B2

(12) United States Patent
Mostoller et al.

(10) Patent No.: US 10,476,429 B2
(45) Date of Patent: Nov. 12, 2019

(54) SOLAR JUNCTION BOX

(71) Applicant: Tyco Electronics Corporation, Berwyn, PA (US)

(72) Inventors: Matthew Edward Mostoller, Hummelstown, PA (US); Christopher George Daily, Harrisburg, PA (US); Charles Raymond Gingrich, III, Mechanicsburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 14/753,770

(22) Filed: Jun. 29, 2015

(65) Prior Publication Data

US 2016/0380588 A1    Dec. 29, 2016

(51) Int. Cl.
*H02S 40/34* (2014.01)
*H02G 3/08* (2006.01)
*H02G 3/16* (2006.01)

(52) U.S. Cl.
CPC ............. *H02S 40/34* (2014.12); *H02G 3/081* (2013.01); *H02G 3/16* (2013.01)

(58) Field of Classification Search
CPC ................................. H02S 40/34; H02G 3/081
USPC ......................................................... 136/244
See application file for complete search history.

(56) References Cited

U.S. PATENT DOCUMENTS 4,460,232 A * 7/1984 Sotolongo ............ H01R 13/501
439/523
5,541,363 A * 7/1996 Weise .................... H02G 3/088
174/38
6,344,612 B1 * 2/2002 Kuwahara ............. H01L 31/048
174/50
7,444,743 B2 * 11/2008 Feldmeier ......... B32B 17/10036
29/748
7,632,109 B2 * 12/2009 Boensch ........... H01L 31/02013
439/521
7,648,371 B2 * 1/2010 Boensch ........... H01L 31/02013
439/76.1

(Continued)

FOREIGN PATENT DOCUMENTS

DE    10 2008 052 348 A1    4/2010
DE    10 2010 029714 A1    10/2011

(Continued)

OTHER PUBLICATIONS

International Search Report, International Application No. PCT/US2016/038491, International Filing Date, Jun. 21, 2016.

*Primary Examiner* — Hung V Ngo

(57) ABSTRACT

A solar junction box for a solar panel includes a contact assembly having a base configured to be mounted to a solar panel and a terminal held by the base. The base has at least one foil opening configured to receive a foil. The terminal has a protection device contact configured to be terminated to a protection device. The terminal has a foil contact configured to be terminated to the foil. The terminal has a terminating contact configured to be electrically connected to a terminating assembly. The solar junction box includes a cover covering the contact assembly. The cover has walls defining a cavity receiving the terminal of the contact assembly. The walls are configured to be mounted directly to the solar panel.

19 Claims, 11 Drawing Sheets

(56) References Cited

U.S. PATENT DOCUMENTS

| | | | | |
|---|---|---|---|---|
| 7,824,190 B2 * | 11/2010 | Beck | ............... | H01L 31/02013 |
| | | | | 136/243 |
| 8,128,439 B2 * | 3/2012 | Feldmeier | ......... | B32B 17/10036 |
| | | | | 439/709 |
| 8,366,471 B2 * | 2/2013 | Giefers | ............... | H01R 4/489 |
| | | | | 439/259 |
| 8,403,711 B2 * | 3/2013 | Xue | ..................... | H02G 3/16 |
| | | | | 439/709 |
| 8,900,019 B2 * | 12/2014 | Yamaguchi | ......... | H01R 13/432 |
| | | | | 439/747 |
| 2011/0195585 A1 * | 8/2011 | Feldmeier | ......... | B32B 17/10036 |
| | | | | 439/110 |
| 2015/0237752 A1 * | 8/2015 | Craig | ............... | H05K 5/0247 |
| | | | | 174/535 |

FOREIGN PATENT DOCUMENTS

| | | |
|---|---|---|
| EP | 1 729 369 A2 | 12/2006 |
| EP | 2 166 622 A2 | 3/2010 |
| WO | 2008/095669 A1 | 8/2008 |

* cited by examiner

SOLAR JUNCTION BOX

BACKGROUND OF THE INVENTION

The subject matter herein relates generally to solar junction boxes for solar panels.

Photovoltaic (PV) modules or arrays, such as solar panels, produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts or greater. For large PV systems, special PV modules are produced with typical power range of up to several 100 W. A photovoltaic module is the basic element of a photovoltaic power generation system. A PV module has many solar cells interconnected in series or parallel, according to the desired voltage and current parameters. PV cells are connected in series with thin contacts, such as a foil. The foil is terminated to terminals in a junction box, which may electrically connect groups of the PV cells and/or solar panels.

The junction box is typically connected to the back side of the solar panel, such as to a backsheet of the solar panel. The foil is terminated to a corresponding terminal in the junction box. However, the foils may be routed in various different directions relative to the solar panel, such as side-to-side, top-to-bottom, bottom-to-top, and the like. The junction box must be oriented in a direction that corresponds to the foil axis direction of the foil for proper termination to the terminal because the terminal is limited to receiving the foil in a single direction. Conventional solar junction boxes only accept the foil from one direction. A need remains for a universal solar junction box capable of accepting foils from different directions.

Termination of the foils to the terminals is difficult and time consuming. The junction boxes are small and enclose the terminals in an interior cavity, which is surrounded by sidewalls of the junction boxes. Access to the terminals and foils is limited. Additionally, the junction box is typically sealed to the solar panel. The silicon or adhesive used to secure the junction box to the solar panel needs to set or cure prior to terminating the foil to the terminal. Waiting for the silicon or adhesive to set or cure is time consuming, adding to the overall assembly time of the PV modules.

BRIEF DESCRIPTION OF THE INVENTION

In one embodiment, a solar junction box is provided for a solar panel having at least one photovoltaic cell and a foil electrically connected to the at least one cell. The solar junction box includes a contact assembly having a base configured to be mounted to the solar panel and a terminal held by the base. The base has at least one foil opening configured to receive the foil. The terminal has a protection device contact configured to be terminated to a protection device. The terminal has a foil contact configured to be terminated to the foil. The terminal has a terminating contact configured to be electrically connected to a terminating assembly. The solar junction box includes a cover covering the contact assembly. The cover has walls defining a cavity receiving the terminal of the contact assembly. The walls are configured to be mounted directly to the solar panel.

In another embodiment, a solar junction box is provided for a solar panel having at least one photovoltaic cell and a foil electrically connected to the at least one cell. The solar junction box includes a contact assembly having a base and a terminal held by the base. The base has a mounting surface configured to be mounted to the solar panel and a terminal surface opposite the mounting surface. The base has at least one foil opening open through the mounting surface and terminal surface being configured to receive the foil. The terminal is exposed beyond the terminal surface. The terminal has a protection device contact configured to be terminated to a protection device. The terminal has a terminating contact configured to be electrically connected to a terminating assembly. The terminal has a foil contact configured to be terminated to the foil. The foil contact is exposed from sides of the contact assembly for terminating the foil to the foil contact. The solar junction box includes a cover having walls defining a cavity receiving the terminal of the contact assembly. The walls cover the contact assembly from the sides of the contact assembly. The walls are configured to be mounted directly to the solar panel.

DETAILED DESCRIPTION OF THE INVENTION

Figure 1:
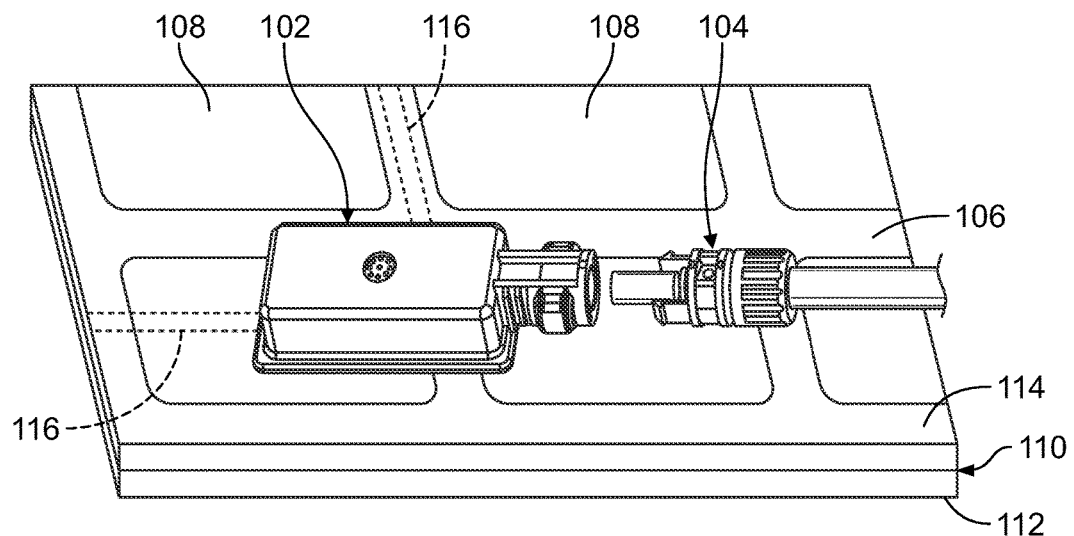
FIG. 1 illustrates a photovoltaic (PV) system formed in accordance with an exemplary embodiment.

FIG. 1 illustrates a photovoltaic (PV) system 100 formed in accordance with an exemplary embodiment. The PV system 100 includes one or more solar junction boxes 102, which may be electrically connected by connector assemblies 104 (e.g., cable connector assemblies). The PV system 100 includes a plurality of PV components 106. In an exemplary embodiment, the PV components 106 may be any type of PV components, such as PV modules or arrays that are used to generate electricity, such as solar panels, or other PV components used within the PV system 100 such as power storage devices, sensors, controllers, and the like. In the illustrated embodiment, the PV components 106 are solar panels and may be referred to hereinafter as solar panels 106. The solar panels 106 have a plurality of PV cells 108 configured to generate electricity.

The connector assemblies 104 may be coupled to solar junction boxes 102 of the same solar panel 106 or solar junction boxes 102 of different solar panels 106. The connector assemblies 104 transmit power and/or data along the transmission path between the PV components 106.

In an exemplary embodiment, the solar panel 106 includes a semiconductor layer 110 sandwiched between a glass layer 112 and a backsheet 114. The semiconductor layer 110 includes the cells 108 and conductors, such as conductive foils 116, connecting the cells 108 in series. Groups of the cells 108 may be electrically connected to the corresponding solar junction box 102. For example, the foil 116 may be terminated to a corresponding terminal in the solar junction box 102. The solar junction boxes 102 may be mounted to the backsheet 114 of the solar panel 106 at any location, such as at or near an edge of the solar panel 106, remote from the edge, near a center of the solar panel 106, or elsewhere. Optionally, the solar junction boxes 102 may be mounted at predetermined mounting locations, which may be located at a predetermined distance from the edge(s) and/or from the corner(s) of the solar panel 106. The foils 116 may extend through the backsheet 114 into the solar junction boxes 102. Optionally, the foils 116 may extend from the edge to the solar junction box 102.

The glass layer 112 is positioned above the semiconductor layer 110 and allows sunlight to pass therethrough to the cells 108. The backsheet 114 is positioned below the semiconductor layer 110. The backsheet 114 may be a plastic layer. Alternatively, the backsheet 114 may be manufactured from another material. For example, the backsheet 114 may be another glass layer. For example, in some various embodiments, the solar panel 106 may be a bifacial solar panel configured to receive sunlight from both sides of the solar panel 106. For example, the backside (backsheet 114) may receive reflective sunlight. Each foil 116 extends along a foil axis, which is generally the longitudinal axis of the foil 116. The foil 116 may be routed in any direction along the solar panel 106, such as up the panel, down the panel, side-to-side across the panel, transverse across the panel, longitudinally, laterally, or otherwise. The foil axis may be parallel to one of the edges; however the foil axis may be transverse to the edges in alternative embodiments. Additionally, different foils 116 may be routed in different directions.

While FIG. 1 is a bottom perspective view showing the solar junction box 102 mounted to the backsheet 114, in use, the glass layer 112 would be on top or upward facing to face the sun and the solar junction box 102 would be mounted to the backside of the solar panel 106. Other orientations are possible and terms denoting orientation (e.g., top, bottom, up, down, etc.) may be relative to the orientation shown in the particular Figure as opposed to an orientation in use.

Figure 4:
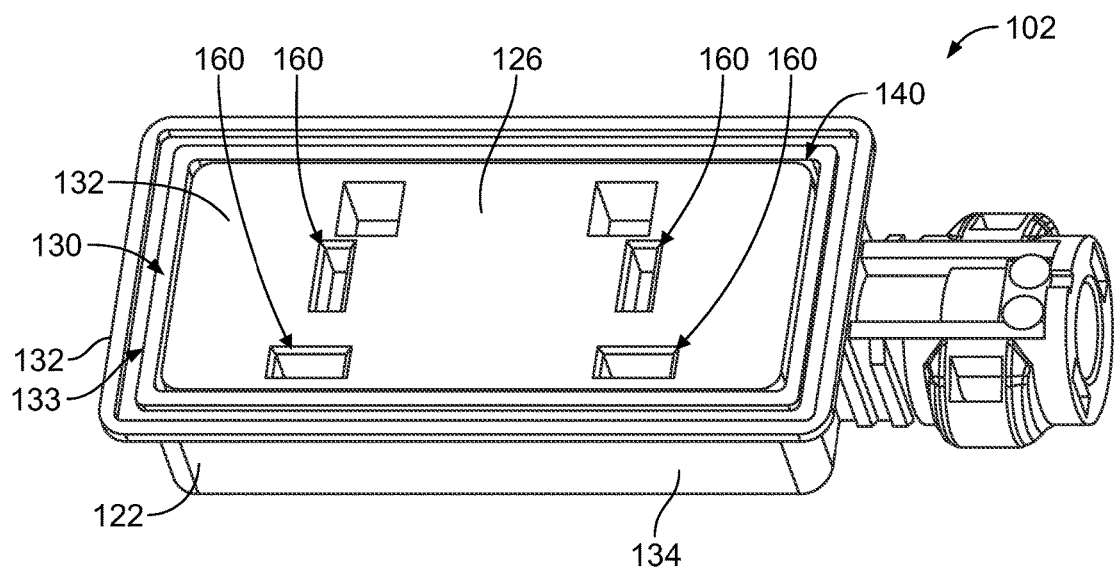
FIG. 4 is a perspective view of a mounting side of the solar junction box in an assembled state.
Figure 2:
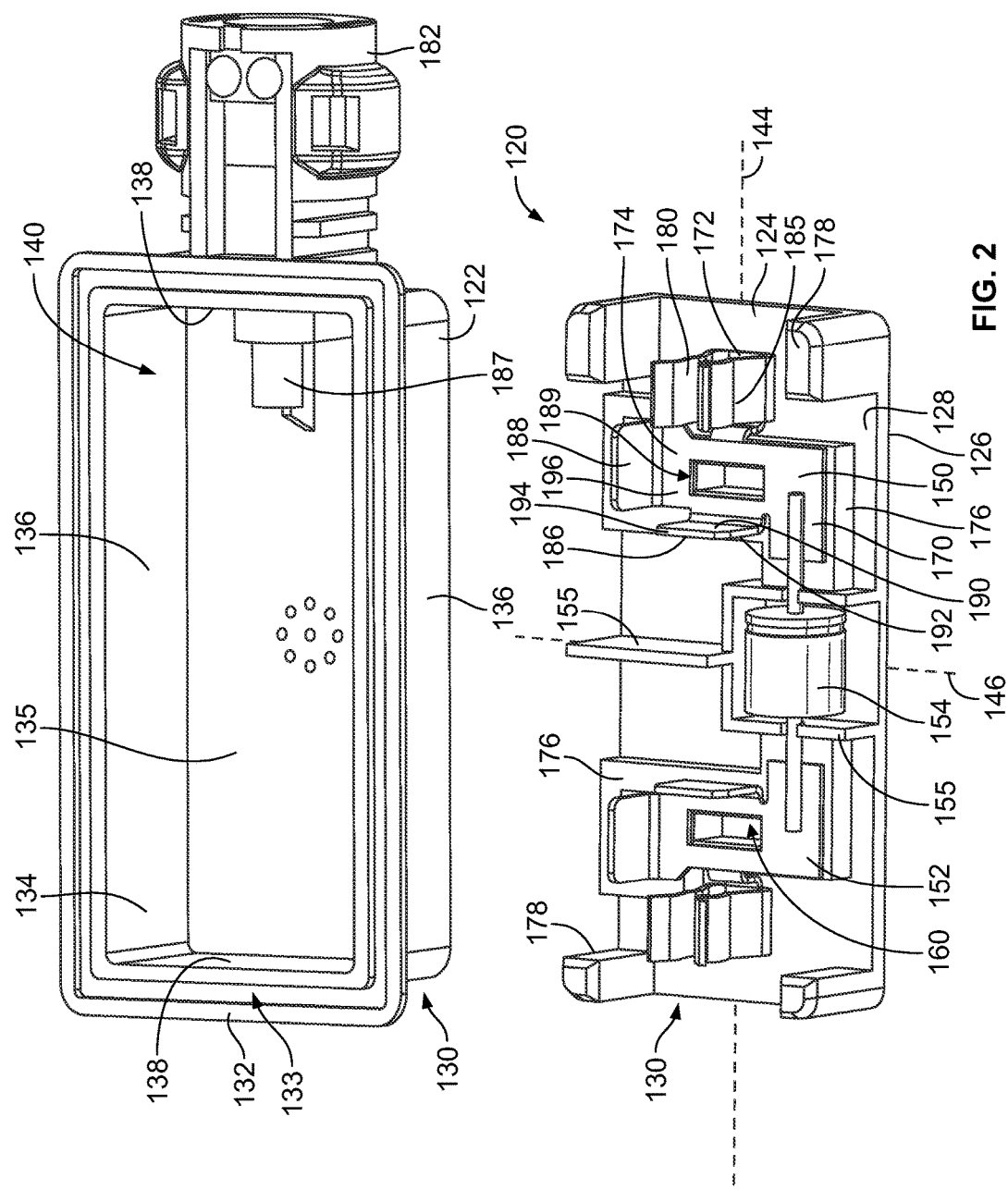
FIG. 2 is a partially exploded view of a solar junction box formed in accordance with an exemplary embodiment of the PV system.
Figure 3:
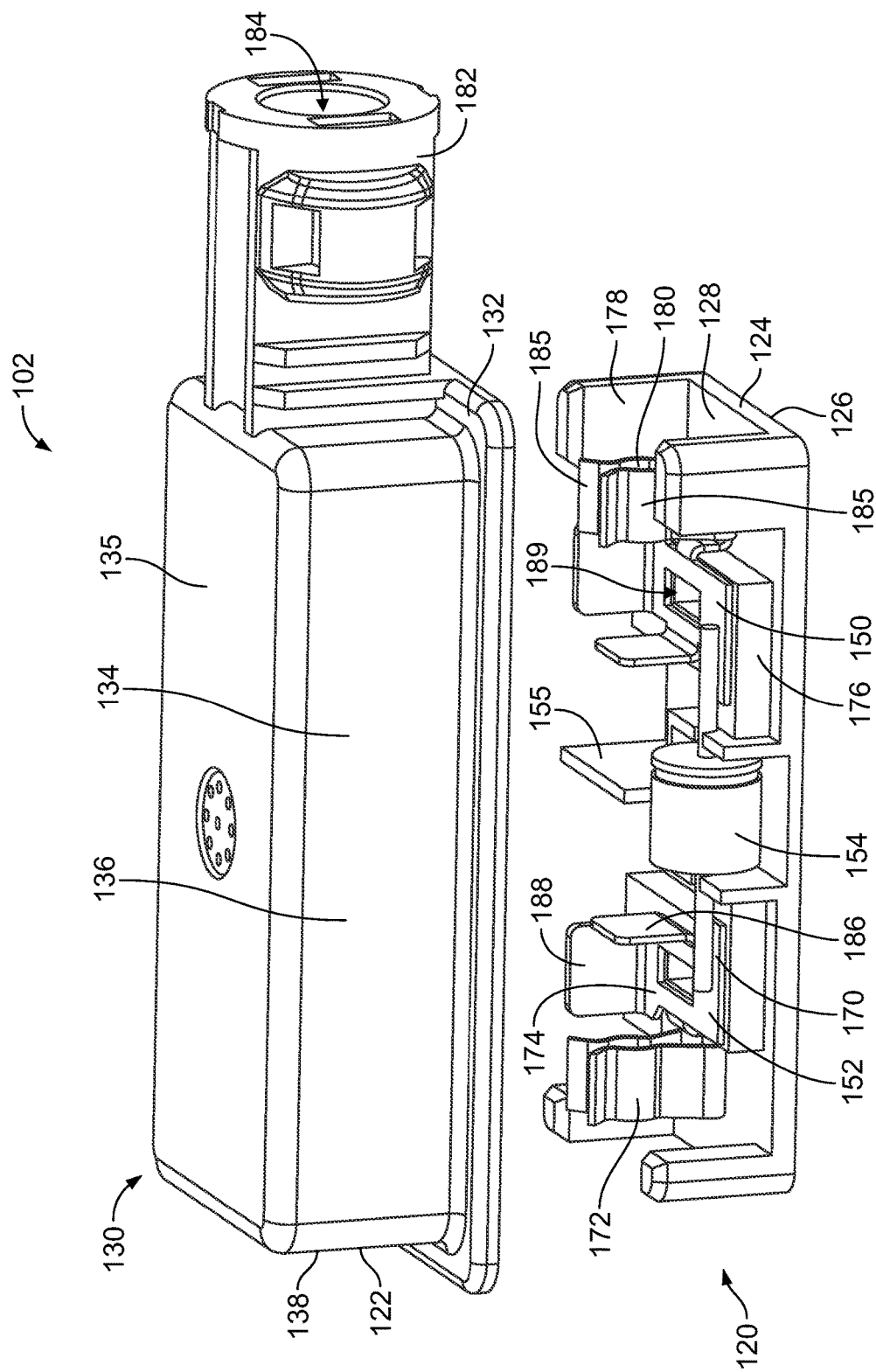
FIG. 3 is another partially exploded view of the solar junction box showing the components thereof poised for assembly.

FIG. 2 is a partially exploded view of the solar junction box 102 formed in accordance with an exemplary embodiment. FIG. 3 is another partially exploded view of the solar junction box 102 showing the components poised for assembly. FIG. 4 is a perspective view of a mounting side of the solar junction box 102 in an assembled state.

The solar junction box 102 includes a contact assembly 120 and a cover 122 used to cover the contact assembly 120. The contact assembly 120 includes one or more terminals 150, 152 and the foils 116 are terminated to corresponding terminals 150, 152. The contact assembly 120 has a low profile. The contact assembly 120 does not include sidewalls, allowing the terminals 150, 152 to be exposed and accessible for termination of the foils 116 to the terminals 150, 152. The cover 122 includes the sidewalls that enclose the terminals 150, 152 and the cover 122 is positioned on the contact assembly 120 after the foils 116 are terminated to the terminals 150, 152. The contact assembly 120 and the cover 122 together form a housing 130 used to house the terminals 150, 152. The housing 130 provides environmental protection for the terminals 150, 152 from the elements, such as from water, debris and the like.

The housing 130 is defined by the cover 122 and a base 124 of the contact assembly 120. The base 124 holds the terminals 150, 152 and is configured to be initially mounted to the solar panel 106 to allow the foils 116 to be terminated to the terminals 150, 152. The cover 122 may then be mounted to the base 124 and/or the solar panel 106. The base 124 and the cover 122 are dielectric, such as plastic. The base 124 and the cover 122 may be molded pieces.

The base 124 includes a mounting surface 126 and a terminal surface 128 opposite the mounting surface 126. The base 124 may be generally planar between the mounting and terminal surfaces 126, 128 (e.g., the mounting and terminal surfaces may be generally parallel). The terminal surface 128 may have features (e.g., steps) that extend from the terminal surface 128 such that the terminal surface 128 is not completely planar. The terminals 150, 152 are provided on the terminal surface 128. For example, the terminals 150, 152 may be mounted to the terminal surface 128. The terminals 150, 152 may extend along and/or above the terminal surface 128.

The mounting surface 126 is mounted directly to the solar panel 106. For example, adhesive or epoxy (e.g., double sided tape) may be used to either temporarily or permanently secure the mounting surface 126 to the solar panel 106. In an exemplary embodiment, the cover 122 is directly mounted to the solar panel 106. The cover 122 may be sealed to the solar panel 106, such as by silicon or epoxy. For example, the cover 122 may include a flange 132 (FIG. 2) defining a mounting edge of the cover 122 with a channel 133 (FIG. 4) therein that may be filled with a bead of silicon or other adhesive.

The cover 122 includes a plurality of walls 134 extending from a lid 135. The lid 135 is positioned opposite the base 124. Any number of walls 134 may be provided to provide an appropriate shaped housing for the particular application. In the illustrated embodiment, the walls 134 include side walls 136 and end walls 138 extending between the side walls 136. Optionally, the housing 130 may have a rectangular cross section, being long and narrow, with the side walls 136 longer than the end walls 138. Other shapes are possible in alternative embodiments. The side walls 136 and end walls 138 define a cavity 140 of the cover 122 and the housing 130. The electrical components of the solar junction box 102, such as the terminals 150, 152 are received in the cavity 140 when the cover 122 is mounted to the solar panel 102.

The housing 130 (e.g., the base 124 and the cover 122) is long and narrow and generally extends along a mutually perpendicular primary axis 144 and secondary axis 146. The primary axis 144 may extend in a longitudinal direction and may define a longitudinal axis 144. The secondary axis 146 may extend in a lateral direction and may define a lateral axis 146. In an exemplary embodiment, the side walls 136 are generally parallel to the primary axis 144 and the end walls 138 are generally parallel to the secondary axis 146.

In an exemplary embodiment, the solar junction box 102 includes a first terminal 150 and a second terminal 152 held by the base 124. In an exemplary embodiment, the first terminal 150 may be a positive terminal (referred to hereinafter as a positive terminal 150) and the second terminal 152 may be a negative terminal (referred to hereinafter as a negative terminal 152). Optionally, the terminals 150, 152 may be identical, thus reducing a part count of the contact assembly 120 or the number of unique parts needed for the system.

In an exemplary embodiment, the solar junction box 102 includes a protection device 154 electrically connected to the terminals 150, 152. The protection device 154 may be used to bypass or isolate the solar circuit. For example, the protection device 154 may allow power flow in one direction and restrict power flow in an opposite direction. Optionally, the protection device 154 may limit power flow in a direction from the solar cell 106 and restrict power flow back into the solar cell 106 in certain circumstances. For example, when the solar cell 106 is shaded or damaged and not producing electricity, the protection device 154 may block reverse flow of electricity through the system back to the cells 108, which may cause damage to the cells 108. The protection device 154, as in the illustrated embodiment, may be a bypass diode and may referred to hereinafter as bypass diode 154; however the protection device 154 is not limited to a bypass diode. Other types of protection devices 154 may be used in alternative embodiments. For example, the protection device 154 may be a circuit assembly including a circuit board and other components that protect the system. The protection device 154 may be an isolator to isolate the terminals 150, 152. The protection device may be a MOSFET. The protection device 154 may include a microprocessor or other component to control and/or monitor the system. Optionally, the bypass diode 154 may be positioned between the positive and negative terminals 150, 152. The bypass diode 154 may be electrically connected to each of the terminals 150, 152. The solar junction box 102 may include other electrical components in alternative embodiments. The solar junction box 102 may include dielectric walls 155 that hold or surround the bypass diode 154. The walls 155 may provide electrical isolation between the terminals 150, 152.

The positive terminal 150 is terminated to a corresponding foil 116 and the negative terminal 152 is terminated to a corresponding foil 116. In an exemplary embodiment, the terminals 150, 152 are configured to receive the foils 116 from different directions (e.g., when the foils 116 run up and down the panel 106 or when the foils 116 run side-to-side across the panel 106). The terminals 150 and/or 152 may be terminated to other components, such as electrical connectors or cables.

The terminals 150, 152 are positioned near corresponding foil openings 160 (FIG. 4) in the base 124. The foil openings 160 receive corresponding foils 116 and allow the foils 116 to pass into the cavity 140. The foil openings 160 are configured to receive the corresponding foils 116, which may enter the housing 130 from different various directions (e.g., longitudinally or laterally). For example, the foil opening 160 is sized and shaped to receive the foil 116 when (if) the foil is extending along the primary axis 144 and when (if) the foil 116 extends along the secondary axis 146. The foil opening 160 is able to accept the foil 116 from either direction. Alternatively, multiple foil openings 160 may be provided configured to accept foils 116 from different directions (e.g., two foil openings 160 associated with each terminal 150, 152).

The positive terminal 150 is mounted to the base 124 and is configured to be electrically connected to the positive foil 116, the bypass diode 154 and may be electrically connected to another component, such as one of the connector assemblies 104 (shown in FIG. 1). In an exemplary embodiment, the positive terminal 150 includes a protection device contact 170 configured to be terminated to the protection device 154, such as to the bypass diode 154. The positive terminal 150 includes a terminating contact 172 configured to be terminated to the connector assembly 104 or other components. The positive terminal 150 includes a foil contact 174 configured to be terminated to the foil 116. The terminal 150 may include intermediate segments extending between the protection device contact 170, terminating contact 172 and/or foil contact 174. The terminal 150 may have portions oriented generally vertically and other portions oriented generally horizontally.

Optionally, the base 124 includes terminal alignment lugs 176 extending from the terminal surface 128. The terminal 150 may be mounted to and/or aligned relative to the base 124 by the corresponding lug 176. The terminal 150 may be secured to the base 124 using fasteners, adhesive, interference fit, latches, heat staked posts, or other securing features (e.g., to prevent lift off). The base 124 includes cover alignment lugs 178 extending from the terminal surface 128. The cover alignment lugs 178 are configured to align the cover 122 to the contact assembly 122. The cover alignment lugs 178 may include chamfered surfaces. The cover alignment lugs 178 may be the only portions of the base 124 that are vertically aligned with or beyond the terminals 150, 152. The base 124 may be devoid of other sidewalls, thus allowing easy access to the foils 116 and the terminals 150, 152 for assembly and termination of the foils 116 to the terminals 150, 152.

The terminating contact 172 includes a terminating interface 180 configured to be electrically connected to the connector assembly 104 or other component. The terminating interface 180 may be accessible through the cover 122 after the cover 122 is positioned over the contact assembly 120. For example, the cover 122 may include a plug boss 182 extending therefrom having a plug channel 184 therethrough. In the illustrated embodiment, the terminating contact 172 includes spring beams 185 defining a spring clip configured to be electrically connected to the connector assembly 104 or another component. Optionally, a portion of the terminating contact 172 may extend into the plug channel 184. The connector assembly 104 may be coupled to (e.g, received in or on) the plug boss 182 for mating with the terminating interface 180. Alternatively, an intermediary component may be provided between the connector assembly 104 and the terminating interface 180, such as in the plug channel 184. For example, another conductor 187 may be held by the cover 122 and coupled to the terminating interface 180. The connector assembly 104 may then be electrically coupled to the intermediary conductor 187.

The foil contact 174 is oriented within the cavity 140 such that the foil contact 174 is configured to be terminated to the foil 116 when the foil 116 extends into the foil opening 160. Optionally, the foil contact 174 may be oriented to receive the foil 116 when the foil 116 extends along the primary axis 144 and the foil contact 174 is oriented within the cavity 140 such that the foil contact 174 is configured to be terminated to the foil 116 when the foil 116 extends into the foil opening 160 along the secondary axis 146. As such, the foil contact 174 is oriented to accept the foil 116 from multiple directions. The foil contact 174 allows the foil 116 to come from either direction into the housing 130 to be terminated thereto.

In the illustrated embodiment, the foil contact 174 includes a first tab 186 and a second tab 188. Optionally, the first and second tabs 186, 188 may be oriented perpendicular to the base 124. For example, the first and second tabs 186, 188 may be oriented vertically while the base 124 is oriented horizontally. In an exemplary embodiment, the foil contact 174 includes a foil opening 189 configured to receive the foil 116. The foil opening 189 may be generally aligned with the foil opening 160 and the foil 116 may pass from the foil opening 160 in the base 124 to the foil opening 189 in the foil contact 174. The tabs 186, 188 are orientated along the foil opening 189, such as aligned with the corresponding foil opening(s) 160, to be terminated to the foil 116 when the foil 116 extends into the foil openings 160, 189 (either along the primary axis 144 or the secondary axis 146). Optionally, the first tab 186 is oriented perpendicular to the second tab 188. In the illustrated embodiment, the first tab 186 extends laterally, such as parallel to the end walls 138 while the second tab 188 extends longitudinally, such as parallel to the side walls 136. The tabs 186, 188 may extend from a common base of the foil contact 174. Alternatively, the second tab 188 may extend from the first tab 186. Other configurations are possible in alternative embodiments.

In an exemplary embodiment, a clip 198 is used to secure the foil 116 to the foil contact 174. For example, the clip 198 may be an omega clip (e.g., omega shaped) that pinches against both sides of the foil contact 174. In the illustrated embodiment, the clip 198 is coupled to the second tab 198 to terminate the foil 116 to the second tab 198; however, the clip 198 may be terminated to the first tab 186, such as when the foil 116 is configured to terminate to the first tab 186. The foil 116 may wrap around the foil contact 174, and the clip 198 may sandwich the foil 116 between the foil contact 174 and the clip 198 along both sides of the foil contact 174. Other types of clips may be provided in alternative embodiments. In other various embodiments the foil 116 may be terminated to the foil contact 174 by other processes other than using a clip. For example, the foil 116 may be pinched by a lance or other portion integral with the terminal 150 or the foil 116 may be welded or soldered to the foil contact 174.

The tabs 186, 188 of the foil contact 174 each have an interior 190 facing the foil opening 160 and an exterior 192 opposite the interior 190. The foil contact 174 includes an outer edge 194 opposite a base 196 of the foil contact 174. The base 196 may abut against or face the base 124. The foil opening 189 is provided in the base 196. When the foil 116 is terminated to the foil contact 174, the foil 116 extends into the foil opening 160, through the foil opening 189 of the foil contact 174 and is wrapped around the foil contact 174 along the interior 190 over the outer edge 194 and along the exterior 192. The clip 198 may press the foil 116 against the interior 190 and exterior 192 to create an electrical connection between the foil 116 and the terminal 150.

The negative terminal 152 is mounted to the base 124 and is configured to be electrically connected to the negative foil 116, the bypass diode 154 and may be electrically connected to another component, such as one of the connector assemblies 104 (shown in FIG. 1). The negative terminal 152 may include similar components as the positive terminal 150 and like components are identified with like reference numbers. Optionally, the negative terminal 152 may be identical to the positive terminal 150 and may be rotated 180° within the cavity 140. Alternatively, the negative terminal 152 may have different features. For example, the negative terminal 152 may not include any terminating contact 172.

Figure 5:
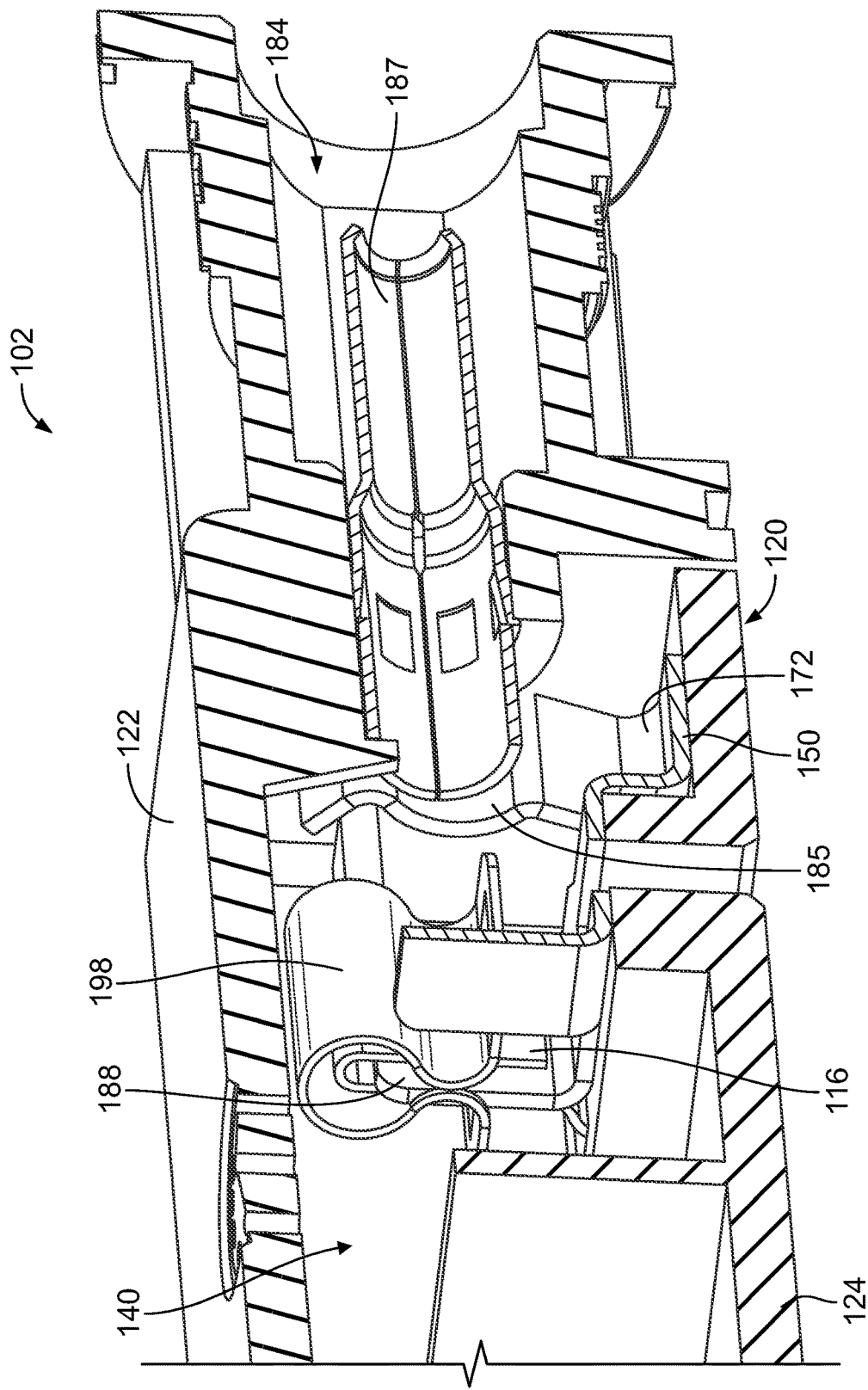
FIG. 5 is a perspective, partial cut-away view of the solar junction box 102 and the foil 116 terminated to the terminal 150.

FIG. 5 is a perspective, partial cut-away view of the solar junction box 102 and the foil 116 terminated to the terminal 150. The positive foil 116 is terminated to the second tab 188 of the positive terminal 150 using the clip 198. The cover 122 is coupled over the contact assembly 120 such that the base 124 and the terminal 150 are positioned in the cavity 140. The cover 122 holds the intermediary conductor 187. In the illustrated embodiment, the intermediary conductor 187 is a pin received in the plug channel 184. The plug channel 184 is configured to receive the connector assembly 104 (shown in FIG. 1). The pin 187 is received in the spring clip between the spring beams 185. The pin 187 is electrically connected to the terminating contact 172 and is configured to electrically connect the terminating contact 172 to the connector assembly 104.

Figure 6:
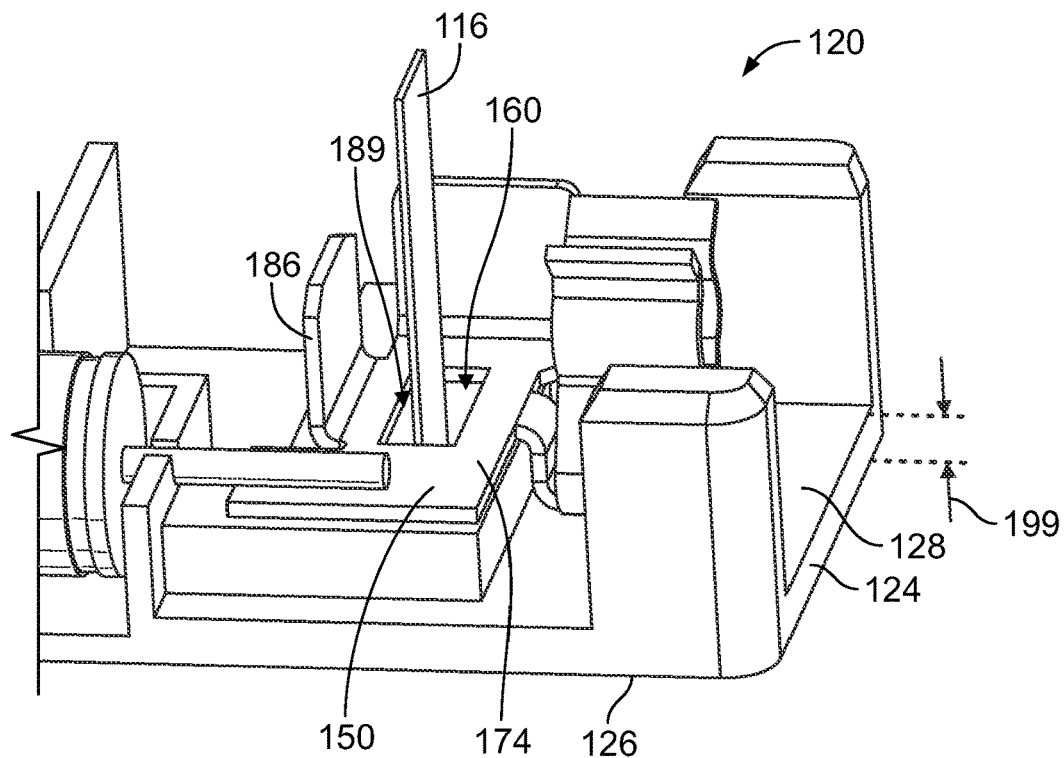
FIGS. 6-8 illustrate a portion of a contact assembly of the solar junction box showing a foil being terminated to a foil contact.
Figure 7:
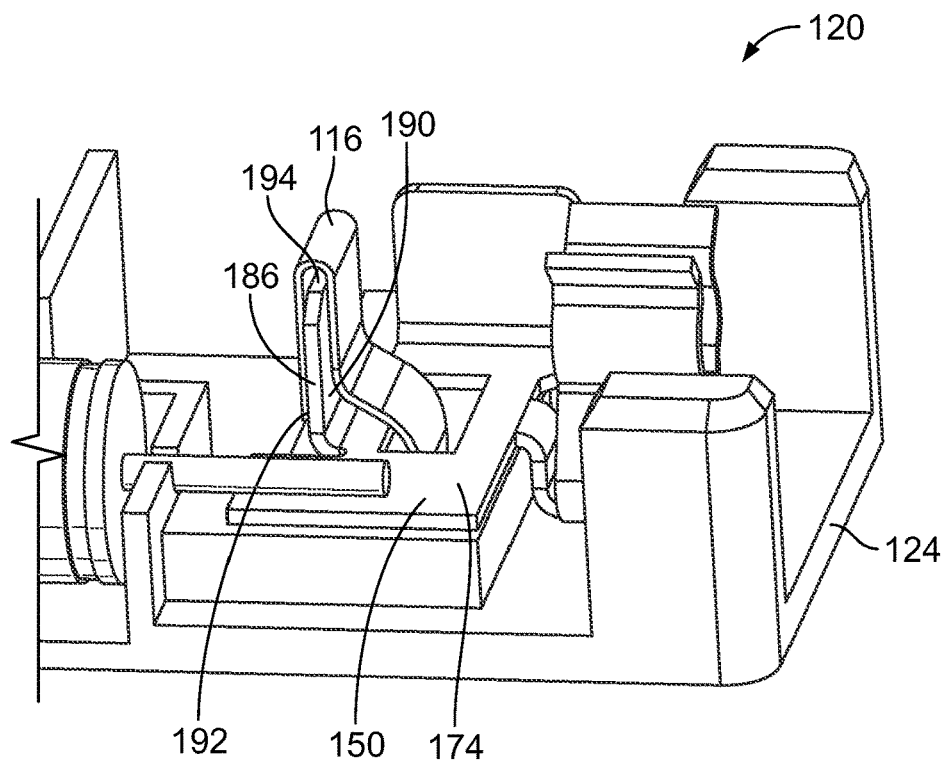
Figure 8:
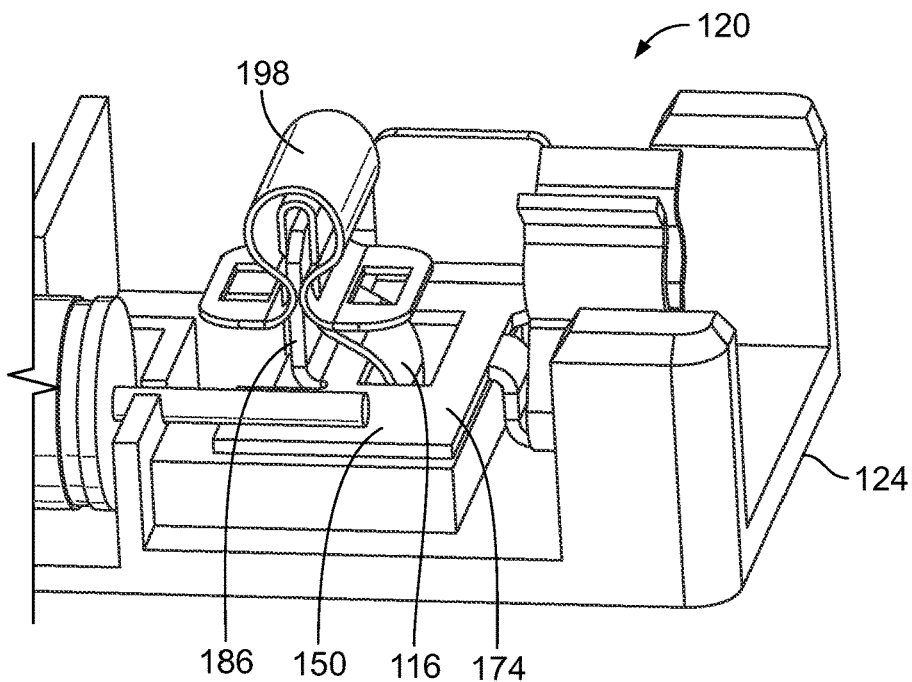
Figure 9:
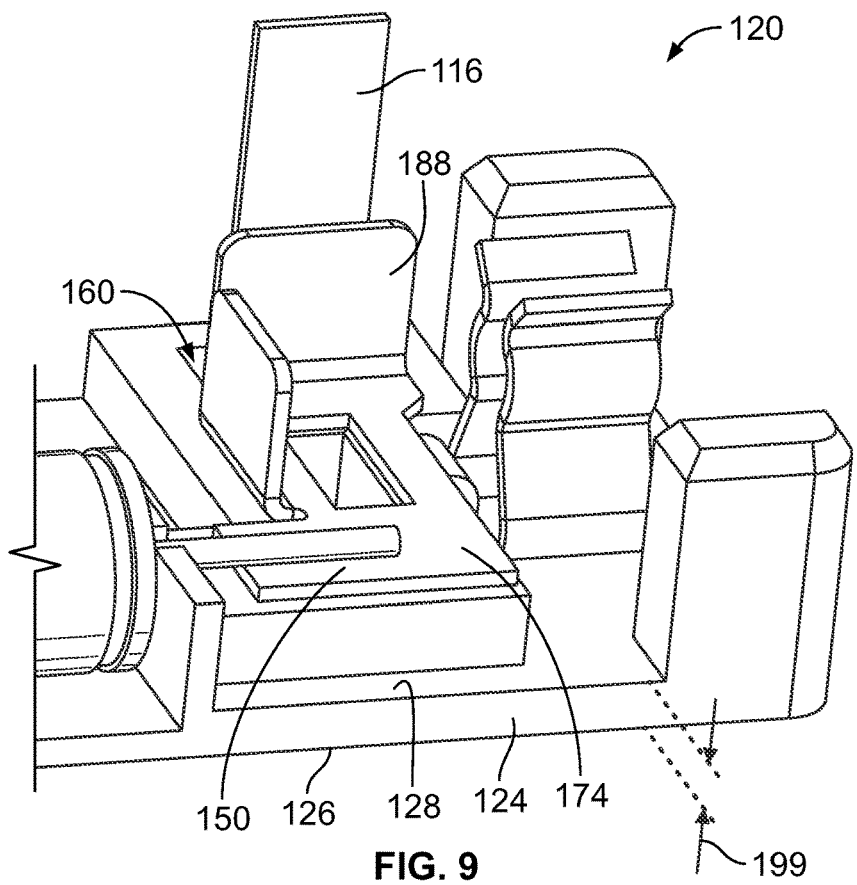
FIGS. 9-11 illustrate a portion of the contact assembly showing the foil being terminated to the foil contact.
Figure 10:
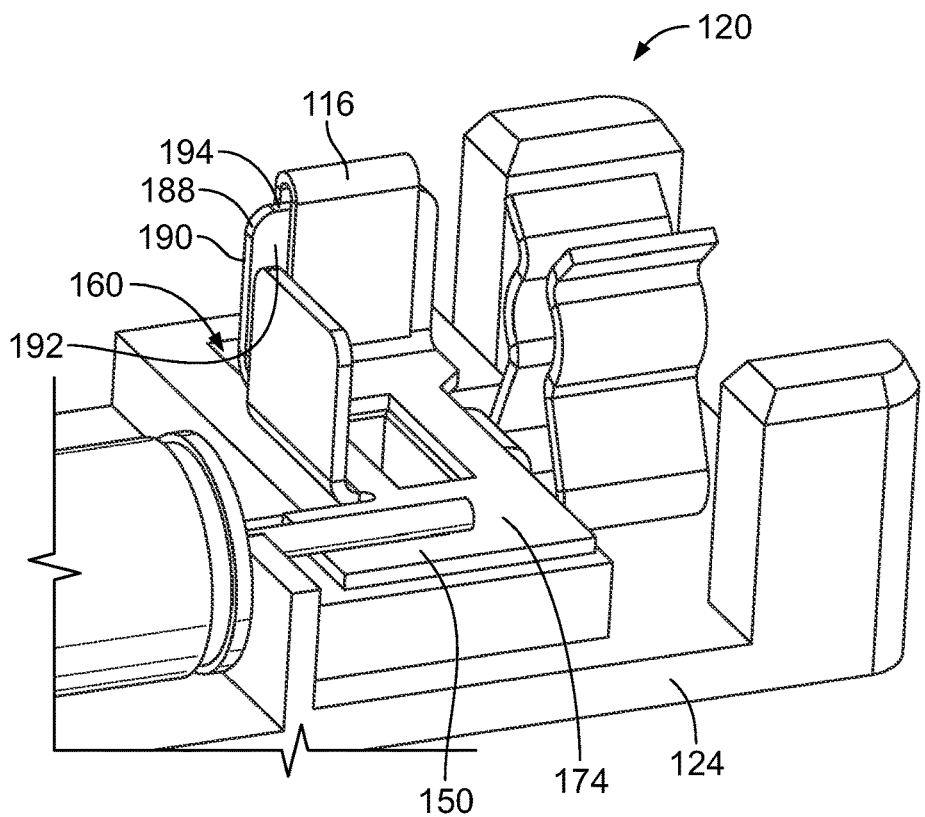
Figure 11:
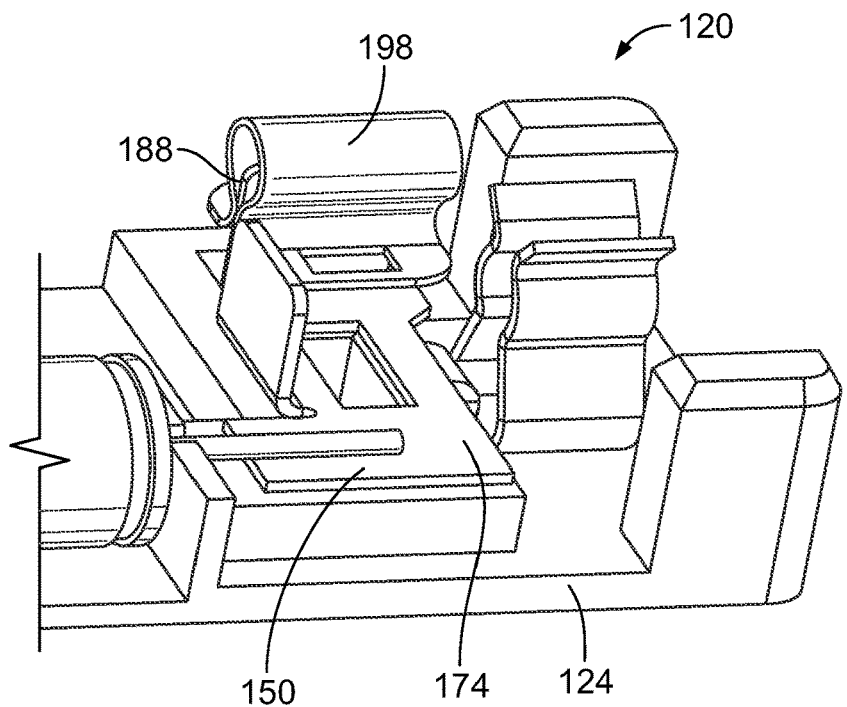

FIGS. 6-8 illustrate a portion of the contact assembly 120 showing the foil 116 being terminated to the foil contact 174. FIGS. 6-8 illustrate the foil 116 extending longitudinally and being terminated to the first tab 186. FIGS. 9-11 illustrate a portion of the contact assembly 120 showing the foil 116 being terminated to the foil contact 174. FIGS. 9-11 illustrate the foil 116 extending laterally and being terminated to the second tab 188. The clip 198 is configured to be selectively coupled to either of the tabs 186, 188 depending on how the foil 116 enters the contact assembly (e.g., longitudinally or laterally).

As shown in FIGS. 6 and 9, the foil 116 extends through the corresponding foil opening 160. Optionally, as in the illustrated embodiment, the foil 116 extends through the foil opening 189 when the foil 116 extends longitudinally and the foil 116 extends from outside the foil contact 174 when the foil 116 extends laterally. Alternatively, the foil 116 may extend into the foil opening 189 when extending longitudinally and laterally.

As shown in FIGS. 7 and 10, the foil 116 wraps around the corresponding outer edge 194 of the tab 186 or 188. The foils 116 engage the interiors 190 and the exteriors 192 of the terminal 150. Other termination methods are possible in alternative embodiments.

In an exemplary embodiment, the base 124 does not include any side walls. Rather, the base 124 is open above the terminal surface 128, providing access to the terminal 150 and the foil 116. The foil 116 may be easily grasped by the installer and wrapped around the tab 186 or 188 without interference from any side walls. The foil 116 and terminal 150 may be accessible from the sides and/or from the ends and do not need to be accessed from above as would be the case if the base 124 included sidewalls. The base 124 has a height 199 between the mounting surface 126 and the terminal surface 128. The height 199 is low profile. The base 124 is relatively thin, such as compared to a height of the cover 122 (shown in FIG. 2). The base 124 may be thinner than a height of the tabs 186, 188.

As shown in FIGS. 8 and 11, the clip 198 secures the foil 116 to the corresponding tab 186, 188. The clip 198 mechanically secures and electrically connects the foil 116 to the tab 186, 188.

Figure 12:
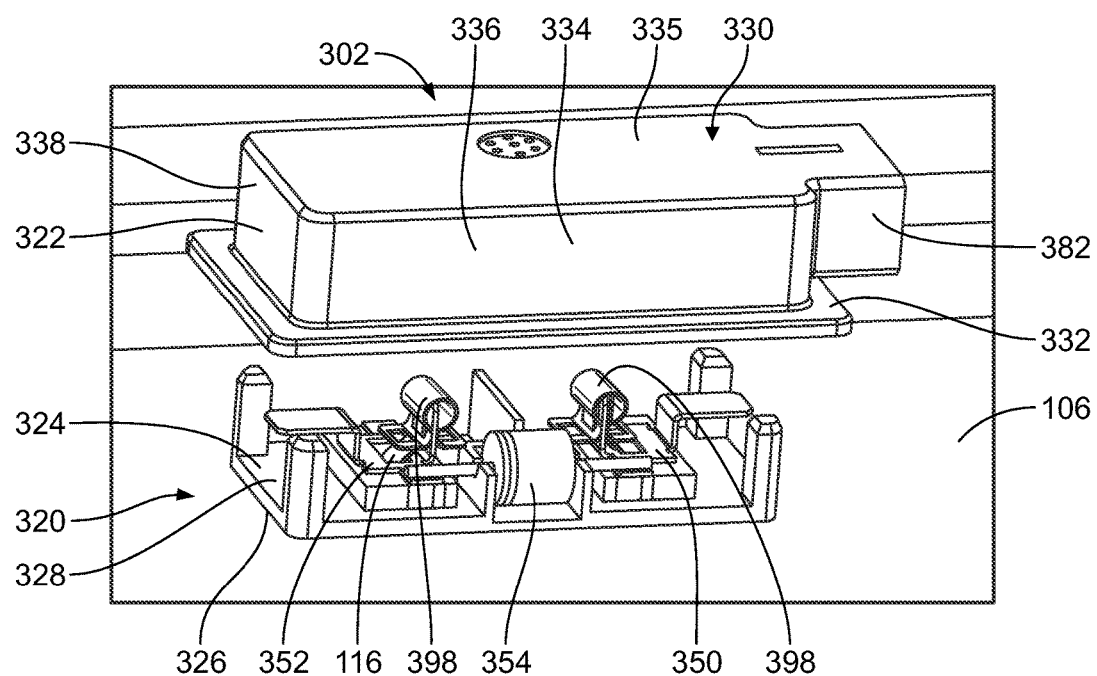
FIG. 12 is a perspective, partially exploded view of a solar junction box in accordance with an exemplary embodiment.
Figure 13:
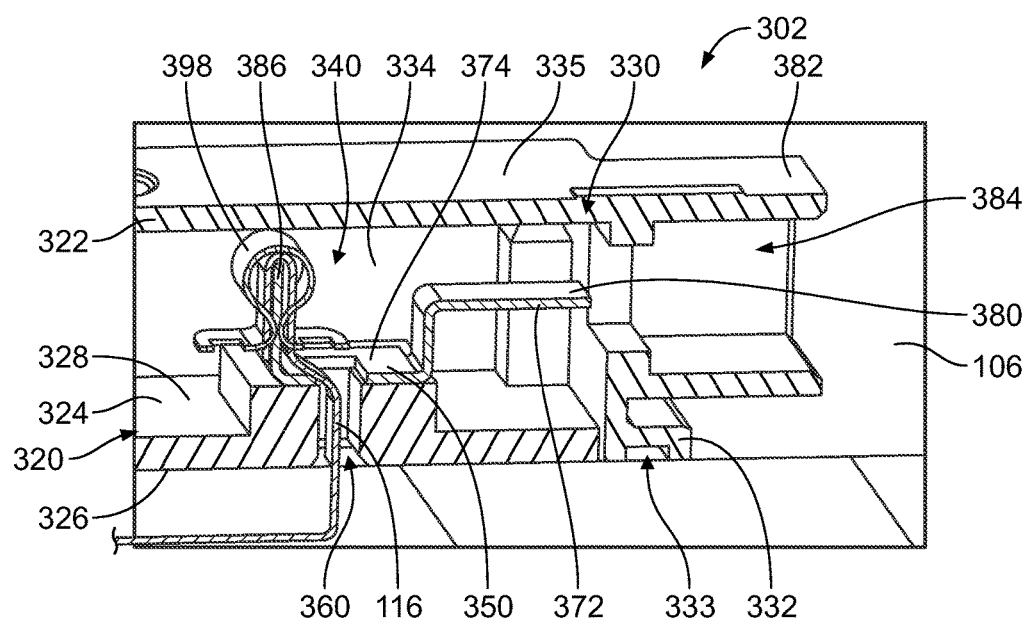
FIG. 13 is a cross-sectional view of a portion of the solar junction box shown in FIG. 12 in an assembled state and mounted to the solar panel.
Figure 14:
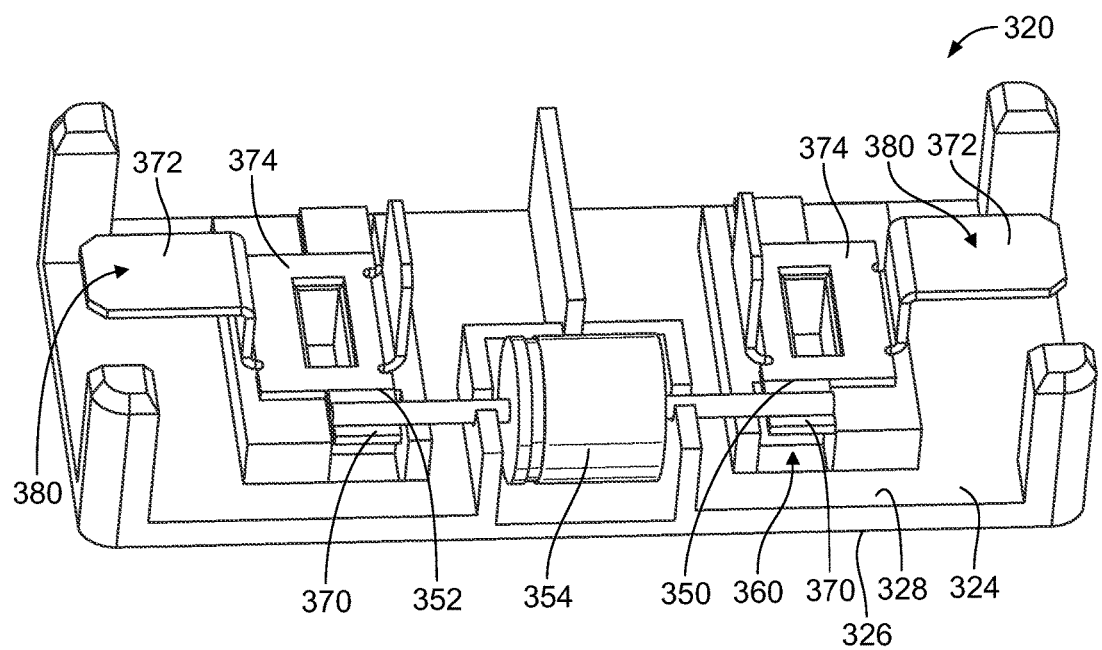
FIG. 14 is a perspective view of a portion of the solar junction box, showing a contact assembly of the solar junction box.

FIG. 12 is a perspective, partially exploded view of a solar junction box 302 in accordance with an exemplary embodiment. FIG. 13 is a cross-sectional view of a portion of the solar junction box 302 in an assembled state and mounted to the solar panel 106. FIG. 14 is a perspective view of a portion of the solar junction box 302, showing a contact assembly 320 of the solar junction box 302. The solar junction box 302 is similar to the solar junction box 102 (shown in FIG. 1); however the solar junction box 302 includes a variation of the terminal and a variation of the mating interface with a corresponding connector assembly. The solar junction box 302 may be mounted to the solar panel 106 (FIGS. 12 and 13).

The solar junction box 302 includes the contact assembly 320 (FIGS. 12 and 14) and a cover 322 (FIGS. 12 and 13) used to cover the contact assembly 320. The contact assembly 320 includes one or more terminals 350, 352 and the foils 116 are terminated to corresponding terminals 350, 352. The contact assembly 320 has a low profile. The contact assembly 320 does not include sidewalls, allowing the terminals 350, 352 to be exposed and accessible for termination of the foils 116 to the terminals 350, 352. The cover 322 includes the sidewalls that enclose the terminals 350, 352 and the cover 322 is positioned on the contact assembly 320 after the foils 116 are terminated to the terminals 350, 352. The contact assembly 320 and the cover 322 together form a housing 330 used to house the terminals 350, 352. The housing 330 provides environmental protection for the terminals 350, 352 from the elements, such as from water, debris and the like.

The housing 330 is defined by the cover 322 and a base 324 of the contact assembly 320. The base 324 holds the terminals 350, 352 and is configured to be initially mounted to the solar panel 106 to allow the foils 116 to be terminated to the terminals 350, 352. The cover 322 may then be mounted to the base 324 and/or the solar panel 106. The base 324 and the cover 322 are dielectric, such as plastic. The base 324 and the cover 322 may be molded pieces.

The base 324 includes a mounting surface 326 and a terminal surface 328 opposite the mounting surface 326. The base 324 may be generally planar between the mounting and terminal surfaces 326, 328 (e.g., the mounting and terminal surfaces may be generally parallel). The terminals 350, 352 are provided on the terminal surface 328. The mounting surface 326 is mounted directly to the solar panel 106. In an exemplary embodiment, the cover 322 is directly mounted to the solar panel 106 around the contact assembly 320. The cover 322 may be sealed to the solar panel 106, such as by silicon or epoxy. For example, the cover 322 may include a flange 332 (FIG. 13) defining a mounting edge of the cover 322 with a channel 333 (FIG. 13) therein that may be filled with a bead of silicon or other adhesive.

The cover 322 includes a plurality of walls 334 extending from a lid 335. The lid 335 is positioned opposite the base 324. In the illustrated embodiment, the walls 334 include side walls 336 and end walls 338 extending between the side walls 336. The side walls 336 and end walls 338 define a cavity 340 of the cover 322 and the housing 330. The electrical components of the solar junction box 302, such as the terminals 350, 352 are received in the cavity 340 when the cover 322 is mounted to the solar panel 302. Optionally, the terminals 350, 352 may be identical, thus reducing a part count of the contact assembly 320.

In an exemplary embodiment, the solar junction box 302 includes a protection device 354 electrically connected to the terminals 350, 352. Optionally, the protection device 354 may be a bypass diode and may referred to hereinafter as bypass diode 354; however the protection device 354 is not limited to a bypass diode.

In the illustrated embodiment, the terminals 350, 352 are configured to receive the foils 116 from a single direction, such as a longitudinal direction through corresponding foil openings 360 (FIG. 13) in the base 324; however, in alternative embodiments, the terminals 350, 352 may receive the foils 116 from different directions (e.g., when the foils 116 run up and down the panel 106 or when the foils 116 run side-to-side across the panel 106). In an exemplary embodiment, the terminals 350 and/or 352 are configured to be terminated to other components, such as an electrical connector.

In an exemplary embodiment, the terminals 350, 352 each include a protection device contact 370 configured to be terminated to the protection device 354, such as to the bypass diode 354. The terminals 350, 352 include a terminating contact 372 configured to be electrically connected to, such as directly terminated to, a corresponding connector assembly 304 (FIG. 15) or other component. In the illustrated embodiment, the terminating contact 372 is oriented horizontally and is configured to be mated to the connector assembly 304 in a horizontal mating direction. The terminals 350, 352 include a foil contact 374 configured to be terminated to the foils 116.

The terminating contact 372 includes a terminating interface 380 configured to be electrically connected to the connector assembly 304 or other component. The terminating interface 380 may be accessible through the cover 322 after the cover 322 is positioned over the contact assembly 320. For example, the cover 322 may include a plug boss 382 (FIG. 13) extending therefrom having a plug channel 384 (FIG. 13) therethrough. Optionally, the cover 322 may include only one plug boss 382 and thus only one of the terminals 350, 352 may be accessible and utilized depending on the orientation of the cover 322 on the contact assembly 320; however, both terminals 350, 352 are able to be mated with the connector assembly 304. In the illustrated embodiment, the terminating contact 372 includes a blade aligned with the plug channel 384 that is configured to be electrically connected to the connector assembly 304, such as when the connector assembly 304 is plugged into the plug boss 382. Other types of terminating interfaces 380 may be provided in alternative embodiments.

The foil contact 374 is oriented within the cavity 340 such that the foil contact 374 is configured to be terminated to the foil 116 when the foil 116 extends into the foil opening 360. In the illustrated embodiment, the foil contact 374 includes a tab 386 and the foil 116 may be wrapped around the tab 386 and terminated with a clip 398.

Figure 15:
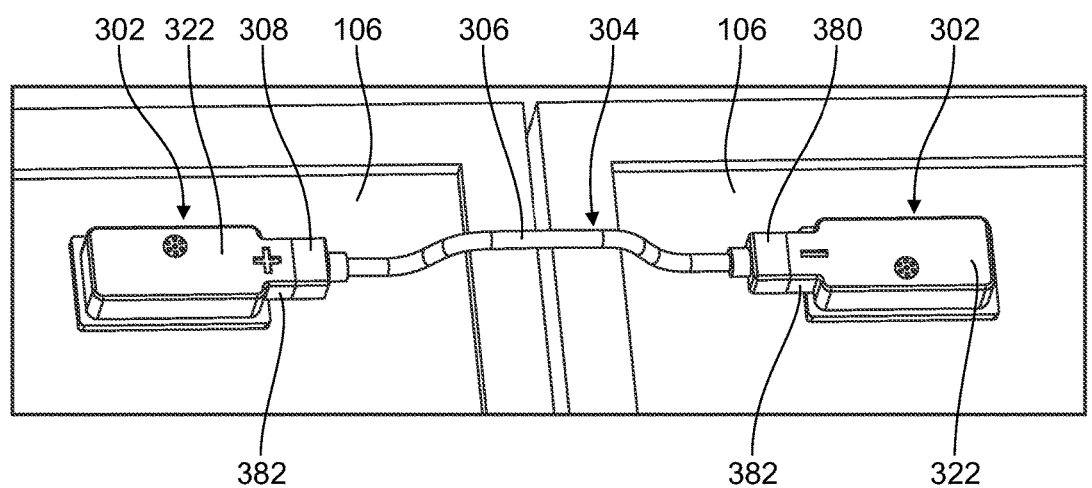
FIG. 15 illustrates solar junction boxes mounted to two different solar panels with a connector assembly electrically connected therebetween.

FIG. 15 illustrates solar junction boxes 302 mounted to two different solar panels 106 with a connector assembly 304 electrically connected therebetween. The connector assembly 304 is a cable connector assembly having a cable 306 extending between opposite connectors 308, 310. The connectors 308, 310 are electrically connected to corresponding terminals 350, 352 (FIG. 14).

The covers 322 of the solar junction boxes 302 are mounted in opposite directions such that the plug bosses 382 face each other. One of the covers 322 (e.g., the cover on the left) is aligned with the positive terminal 350 of the corresponding contact assembly 320 (FIG. 14) while the other cover 322 (e.g., the cover on the right) is aligned with the negative terminal 352 of the corresponding contact assembly 320. The connectors 308, 310 are plugged into the plug bosses 382 and electrically connected to the corresponding terminals 350, 352 to electrically connect the solar junction boxes 302 in series.

Figure 16:
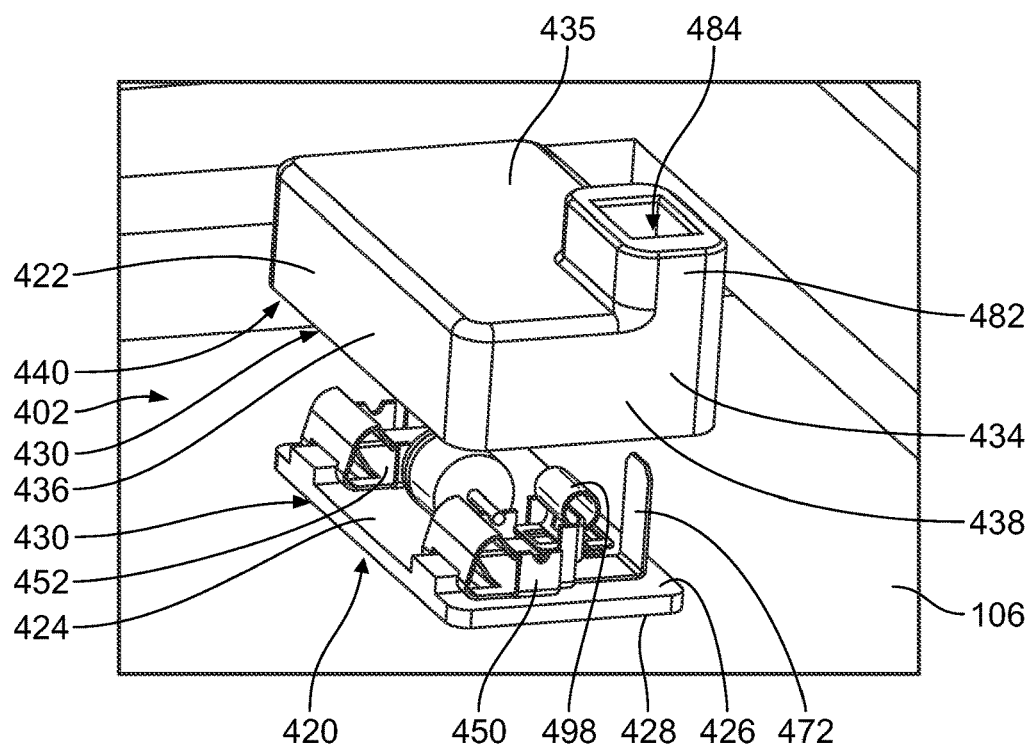
FIG. 16 is a perspective, partially exploded view of a solar junction box in accordance with an exemplary embodiment.
Figure 17:
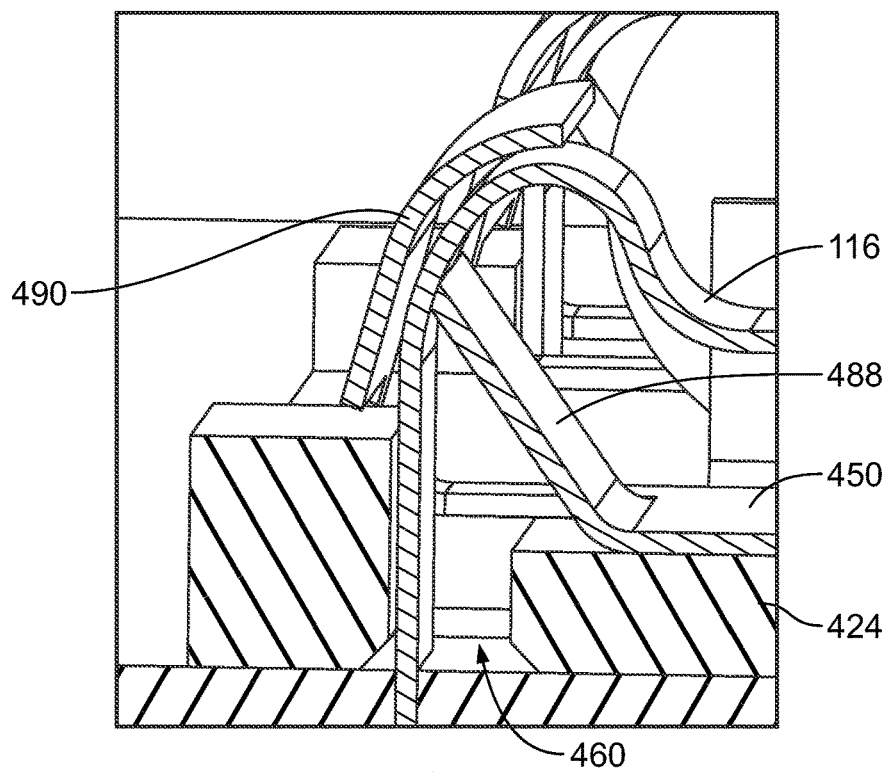
FIG. 17 is a cross-sectional view of a portion of the solar junction box shown in FIG. 16 mounted to the solar panel.
Figure 18:
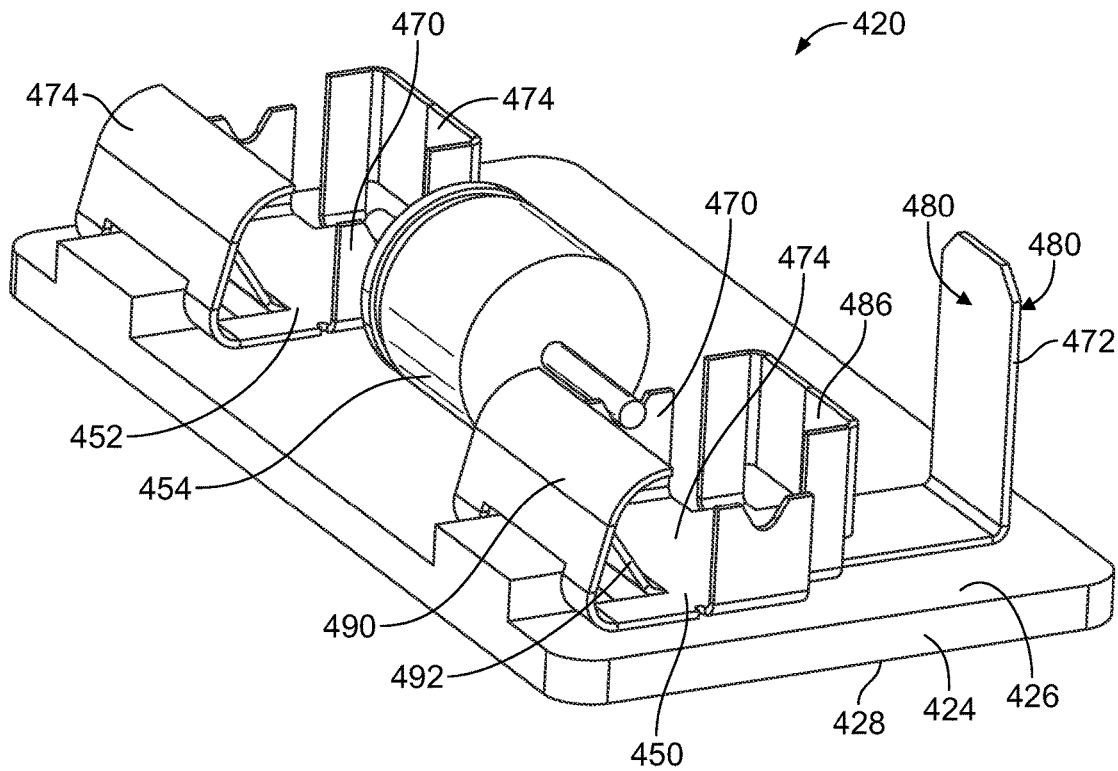
FIG. 18 is a perspective view of a portion of the solar junction box, showing a contact assembly of the solar junction box.

FIG. 16 is a perspective, partially exploded view of a solar junction box 402 in accordance with an exemplary embodiment. FIG. 17 is a cross-sectional view of a portion of the solar junction box 402 mounted to the solar panel 106. FIG. 18 is a perspective view of a portion of the solar junction box 402, showing a contact assembly 420 of the solar junction box 402. The solar junction box 402 is similar to the solar junction box 102 (shown in FIG. 1); however the solar junction box 402 includes a variation of the terminal and a variation of the mating interface with a corresponding connector assembly. The solar junction box 402 may be mounted to the solar panel 106 (FIGS. 16 and 17).

The solar junction box 402 includes the contact assembly 420 (FIGS. 16 and 18) and a cover 422 (FIG. 16) used to cover the contact assembly 420. The contact assembly 420 includes one or more terminals 450, 452 and the foils 116 are terminated to corresponding terminals 450, 452. The contact assembly 420 has a low profile. The contact assembly 420 does not include sidewalls, allowing the terminals 450, 452 to be exposed and accessible for termination of the foils 116 to the terminals 450, 452. The cover 422 includes the sidewalls that enclose the terminals 450, 452 and the cover 422 is positioned on the contact assembly 420 after the foils 116 are terminated to the terminals 450, 452. The contact assembly 420 and the cover 422 together form a housing 430 used to house the terminals 450, 452. The housing 430 provides environmental protection for the terminals 450, 452 from the elements, such as from water, debris and the like.

The housing 430 is defined by the cover 422 and a base 424 of the contact assembly 420. The base 424 holds the terminals 450, 452 and is configured to be initially mounted to the solar panel 106 to allow the foils 116 to be terminated to the terminals 450, 452. The cover 422 may then be mounted to the base 424 and/or the solar panel 106. The base 424 and the cover 422 are dielectric, such as plastic. The base 424 and the cover 422 may be molded pieces.

The base 424 includes a mounting surface 426 and a terminal surface 428 opposite the mounting surface 426. The base 424 may be generally planar between the mounting and terminal surfaces 426, 428 (e.g., the mounting and terminal surfaces may be generally parallel). The terminals 450, 452 are provided on the terminal surface 428. The mounting surface 426 is mounted directly to the solar panel 106. In an exemplary embodiment, the cover 422 is directly mounted to the solar panel 106 around the contact assembly 420. The cover 422 may be sealed to the solar panel 106, such as by silicon or epoxy.

The cover 422 includes a plurality of walls 434 extending from a lid 435. The lid 435 is positioned opposite the base 424. In the illustrated embodiment, the walls 434 include side walls 436 and end walls 438 extending between the side walls 436. The side walls 436 and end walls 438 define a cavity 440 of the cover 422 and the housing 430. The electrical components of the solar junction box 402, such as the terminals 450, 452 are received in the cavity 440 when the cover 422 is mounted to the solar panel 402. Optionally, the terminals 450, 452 may be identical, thus reducing a part count of the contact assembly 420. Alternatively, the terminals 450, 452 may be similar; however one of the terminals 450 may include a terminating contact while the other terminal 452 does not.

In an exemplary embodiment, the solar junction box 402 includes a protection device 454 electrically connected to the terminals 450, 452. Optionally, the protection device 454 may be a bypass diode and may referred to hereinafter as bypass diode 454; however the protection device 454 is not limited to a bypass diode.

In the illustrated embodiment, the terminals 450, 452 are configured to receive the foils 116 from a single direction, such as a longitudinal direction through corresponding foil openings 460 (FIG. 13) in the base 424; however, in alternative embodiments, the terminals 450, 452 may receive the foils 116 from different directions (e.g., when the foils 116 run up and down the panel 106 or when the foils 116 run side-to-side across the panel 106). In an exemplary embodiment, the terminals 450 and/or 452 are configured to be terminated to other components, such as an electrical connector.

In an exemplary embodiment, the terminals 450, 452 each include a protection device contact 470 configured to be terminated to the protection device 454, such as to the bypass diode 454. The terminal 450 includes a terminating contact 472 configured to be electrically connected to, such as directly terminated to, a corresponding connector assembly 404 (FIG. 19) or other component; however in other embodiments, both terminals 450, 452 may include terminating contacts 472. In the illustrated embodiment, the terminating contact 472 is oriented vertically and is configured to be mated to the connector assembly 404 in a vertical mating direction. The terminals 450, 452 include a foil contact 474 configured to be terminated to the foils 116.

The terminating contact 472 includes a terminating interface 480 configured to be electrically connected to the connector assembly 404 or other component. The terminating interface 480 may be accessible through the cover 422 after the cover 422 is positioned over the contact assembly 420. For example, the cover 422 may include a plug boss 482 (FIG. 16) extending therefrom having a plug channel 484 (FIG. 16) therethrough. The terminal 450 is accessible through the plug channel 484. In the illustrated embodiment, the terminating contact 472 includes a blade aligned with the plug channel 484 that is configured to be electrically connected to the connector assembly 404, such as when the connector assembly 404 is plugged into the plug boss 482. Other types of terminating interfaces 480 may be provided in alternative embodiments.

The foil contact 474 is oriented within the cavity 440 such that the foil contact 474 is configured to be terminated to the foil 116 when the foil 116 extends into the foil opening 460. In the illustrated embodiment, the foil contact 474 includes a tab 486 and the foil 116 may be wrapped around the tab 486 and terminated with a clip 498. The foil contact 474 includes a spring beam 488 (FIG. 17) used to pinch or sandwich the foil 116 against a tower 490. The foil 116 has multiple points of contact with the foil contact 474, such as at the tab 486 (using the clip 498) and at the tower 490 (using the spring beam 488.

Figure 19:
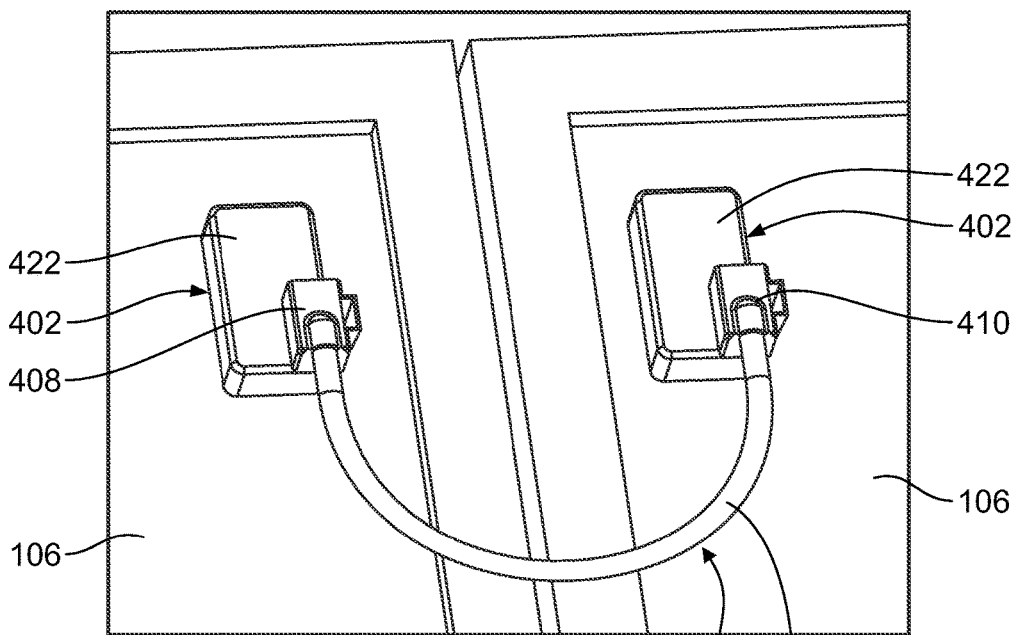
FIG. 19 illustrates solar junction boxes mounted to two different solar panels with a connector assembly electrically connected therebetween.

FIG. 19 illustrates solar junction boxes 402 mounted to two different solar panels 106 with a connector assembly 404 electrically connected therebetween. The connector assembly 404 is a cable connector assembly having a cable 406 extending between opposite connectors 408, 410. The connectors 408, 410 are electrically connected to corresponding terminals 450 (FIG. 18), which may define positive and negative terminals of the different solar junction boxes 402.

The covers 422 of the solar junction boxes 402 are mounted to the solar panels 106 such that the plug bosses 482 face away from the solar panels 106. The plug bosses 482 are aligned with the terminating contacts 472 (FIG. 18) of the terminals 450. The connectors 408, 410 are plugged into/onto the plug bosses 482 and electrically connected to the corresponding terminals 450 to electrically connect the solar junction boxes 402 in series.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. A solar junction box for a solar panel having at least one photovoltaic cell and a foil electrically connected to the at least one cell, the solar junction box comprising:
    a contact assembly having a base having a mounting surface and a terminal surface with side edges between the mounting surface and the terminal surface, the side edges defining a perimeter around the base, the mounting surface configured to be mounted to the solar panel and a terminal held by the base at the terminal surface, the base having at least one foil opening configured to receive the foil, the terminal having a protection device contact configured to be terminated to a protection device, the terminal having a foil contact configured to be terminated to the foil, the terminal having a terminating contact configured to be electrically connected to a terminating assembly; and
    a cover being mounted over the base and the terminal for covering the contact assembly, the cover having walls defining a cavity receiving the terminal of the contact assembly, the walls extending alongside and engaging the side edges of the base to locate the cover relative to the base and relative to the terminal held by the base, the walls extending to mounting edges being configured to be mounted directly to the solar panel separate from the base, wherein the walls of the cover engage the side edges of the base around the entire perimeter of the base to locate the cover relative to the base and relative to the terminal held by the base.

2. The solar junction box of claim 1, wherein the cavity receives the base.

3. The solar junction box of claim 1, wherein the base is generally planar being devoid of sidewalls.

4. The solar junction box of claim 1, wherein the foil contact is exposed beyond the terminal surface and is accessible from the sides of the contact assembly for terminating the foil to the foil contact before the cover is mounted to the solar panel.

5. The solar junction box of claim 1, wherein the base has a height, the cover having a height greater than the height of the base.

6. The solar junction box of claim 1, wherein the base includes a terminal alignment lug, the terminal alignment lug engaging the terminal and aligning the terminal relative to the base.

7. The solar junction box of claim 1, wherein the base includes a cover alignment lug, the cover alignment lug engaging the cover and aligning the cover relative to the base.

8. The solar junction box of claim 1, wherein the base extends along a primary axis and a secondary axis generally perpendicular to the primary axis and wherein the base includes a plurality of the foil openings, at least one of the foil openings configured to receive the foil when the foil extends into the foil opening along the primary axis and at least one of the foil openings configured to receive the foil when the foil extends into the foil opening along the secondary axis.

9. The solar junction box of claim 1, wherein the base extends along a primary axis and a secondary axis generally perpendicular to the primary axis and wherein the foil contact is configured to receive the foil when the foil extends along the primary axis and the foil contact is configured to receive the foil when the foil extends along the secondary axis.

10. The solar junction box of claim 1, wherein the walls of the cover include side walls and end walls and the cover includes a lid defining the cavity with the walls, the lid being arranged opposite the base with the terminal between the lid and the base.

11. The solar junction box of claim 1, wherein the cover includes a plug boss having a plug channel configured to receive a plug, the terminating contact being aligned with the plug channel for electrical connection to the plug.

12. The solar junction box of claim 11, wherein the terminating contact includes spring beams defining a spring clip, a pin being plugged into the spring clip, the pin being electrically connected to the plug.

13. The solar junction box of claim 1, wherein the contact assembly includes a clip configured to mechanically and electrically connect the foil to the foil contact.

14. The solar junction box of claim 1, wherein the foil contact includes at least one tab configured to have the foil wrap around the tab.

15. The solar junction box of claim 14, wherein the foil contact has a foil opening near the tab, the foil opening of the foil contact being aligned with the foil opening of the base, the foil opening of the foil contact being configured to receive the foil therethrough.

16. The solar junction box of claim 1, wherein the contact assembly includes a second terminal, the terminal and the second terminal being identical.

17. A solar junction box for a solar panel having at least one photovoltaic cell and a foil electrically connected to the at least one cell, the solar junction box comprising:

a contact assembly having a base and a terminal held by the base, the base extends along a primary axis and a secondary axis generally perpendicular to the primary axis, the base having a mounting surface configured to be mounted to the solar panel, the base having terminal surface opposite the mounting surface, the base having side edges around a perimeter of the base, the base having at least one foil opening open through the mounting surface and terminal surface being configured to receive the foil, the terminal exposed beyond the terminal surface, the terminal having a protection device contact configured to be terminated to a protection device, the terminal having a terminating contact configured to be electrically connected to a terminating assembly, the terminal having a foil contact configured to be terminated to the foil, the foil contact being exposed from sides of the contact assembly for terminating the foil to the foil contact, the foil opening configured to receive the foil when the foil extends into the foil opening along the primary axis and the foil opening configured to receive the foil when the foil extends into the foil opening along the secondary axis; and a cover being mounted over the base and the terminal, the cover having walls defining a cavity receiving the terminal of the contact assembly, the walls covering the contact assembly from the sides of the contact assembly and engaging the side edges of the base to locate the cover relative to the base and relative to the terminal held by the base, the walls extending from above the contact assembly to below the contact assembly and being configured to be mounted directly to the solar panel.

18. The solar junction box of claim 17, wherein the cavity receives the base.

19. The solar junction box of claim 17, wherein the base is generally planar being devoid of sidewalls.

\* \* \* \* \*